(12) United States Patent
Chou

(10) Patent No.: US 7,127,677 B2
(45) Date of Patent: Oct. 24, 2006

(54) CUSTOMIZABLE REMOTE ORDER ENTRY SYSTEM AND METHOD

(75) Inventor: Chien-Sheng Chou, Cupertino, CA (US)

(73) Assignee: Xerox Corporation, Stamford, CT (US)

( * ) Notice: Subject to any disclaimer, the term of this patent is extended or adjusted under 35 U.S.C. 154(b) by 766 days.

(21) Appl. No.: 09/768,148

(22) Filed: Jan. 23, 2001

(65) Prior Publication Data

US 2002/0099796 A1    Jul. 25, 2002

(51) Int. Cl.
G06F 3/00 (2006.01)
G06F 9/00 (2006.01)
G06F 17/00 (2006.01)

(52) U.S. Cl. .................. 715/741; 715/742; 715/743; 715/744

(58) Field of Classification Search ........... 395/854, 395/855, 765, 826, 866; 709/203, 228; 707/10; 705/26, 37; 715/741, 742, 743, 744
See application file for complete search history.

(56) References Cited

U.S. PATENT DOCUMENTS

| | | | |
|---|---|---|---|
| 5,845,265 A | 12/1998 | Woolston | |
| 5,960,411 A | 9/1999 | Hartman et al. | |
| 5,970,475 A | 10/1999 | Barnes et al. | |
| 5,987,423 A | 11/1999 | Arnold et al. | |
| 6,016,504 A | 1/2000 | Arnold et al. | |
| 6,052,456 A * | 4/2000 | Huang | 379/201.04 |
| 6,085,198 A | 7/2000 | Skinner et al. | |
| 6,092,053 A | 7/2000 | Boesch et al. | |
| 6,134,594 A | 10/2000 | Helland et al. | |
| 6,266,651 B1 | 7/2001 | Woolston | |
| 6,282,517 B1 | 8/2001 | Wolfe et al. | |
| 6,412,008 B1 * | 6/2002 | Fields et al. | 709/228 |
| 6,415,320 B1 | 7/2002 | Hess et al. | |
| 6,466,919 B1 * | 10/2002 | Walker et al. | 705/37 |
| 6,571,245 B1 * | 5/2003 | Huang et al. | 707/10 |
| 6,611,814 B1 * | 8/2003 | Lee et al. | 705/26 |
| 6,636,863 B1 | 10/2003 | Friesen | |
| 6,694,365 B1 | 2/2004 | Wyngarden | |

(Continued)

FOREIGN PATENT DOCUMENTS

CA    232 0413 A1    9/2001

OTHER PUBLICATIONS

SGI, Inc. (last modified Jun. 27, 1997) <http://www.sgi-net.com/page1.html>.

(Continued)

Primary Examiner—Kristine Kincaid
Assistant Examiner—Boris Pesin
(74) Attorney, Agent, or Firm—Fay, Sharpe, Fagan, Minnich & McKee, LLP

(57) ABSTRACT

A system for generating a requisition comprises a client computer system and a server computer system connected via a network. The client computer is configured to allow a plurality of users to access the server computer system. The system further includes a server application comprising a user interface running on the server computer system and having a multi-tier architecture. The multi-tier architecture includes a first tier of client application code for initiating processing by the server application in response to input by a user of the client computer system, a middle tier of object-oriented server application code, and a third tier of shared access and data code. An application programming interface is configured to allow a user, such as a system administrator or the like, to customize the user interface. In a further aspect, a method of customizing a server application is also provided.

22 Claims, 6 Drawing Sheets

U.S. PATENT DOCUMENTS

| | | | |
|---|---|---|---|
| 6,714,962 B1 * | 3/2004 | Helland et al. | 709/203 |
| 6,931,402 B1 * | 8/2005 | Pereira, III | 707/9 |
| 2002/0099796 A1 | 7/2002 | Chou | |

OTHER PUBLICATIONS

SGI *Fulfillment* (last modified Sep. 18, 2000) <http://www.mysgi.com/services/fullfillment.html>.

SGI *Data Depot* (lst modified Sep. 18, 2000) <http://www.mysgi.com/services/datadepot.html>.

SGI *Account Support* (last modified Sep. 18, 2000) <http://www.mysgi.com/services/accountsup.html>.

SGI *Information Services* (last modified Nov. 8, 2000) <http://www.mysgi.com/services/infoservice.html>.

* cited by examiner

CUSTOMIZABLE REMOTE ORDER ENTRY SYSTEM AND METHOD

RELATED APPLICATION

This application is related to U.S. application Ser. No. 09/750,635, filed on Dec. 28, 2000. The aforementioned application is incorporated herein in its entirety.

FIELD OF THE PRESENT INVENTION

The present invention relates generally to a remote order entry system and method and, more particularly, to a tool that allows users who are not directly networked to a client/server requisition system to enter requisitions and inquire into the status of existing requisitions from a remote location using the Internet or an intranet. The present invention finds particular application in the ordering of fulfillment materials such as printed materials, e.g., forms, promotional literature, informational brochures, print on demand items, custom documents, as well as products, samples, other internally consumed items, and the like, and will be described with particular reference thereto. However, it will be recognized that the present invention finds application in other requisition and order entry environments.

BACKGROUND OF THE PRESENT INVENTION

Many electronic commerce systems using the Internet are based on a "shopping cart" model allowing the selection of various items from an electronic catalog. The shopping cart model allows a purchaser to view items in an electronic catalog and select items for purchase by metaphorically adding the items to a shopping cart. When the purchaser is done selecting items, all of the items in the shopping cart are "checked out" (i.e., the order is submitted). The purchaser then typically provides order information, such as payment and shipment information. Often, such systems also allow a user to check the status of a previously placed order.

Many prior art enhancements to such systems have generally been directed to increasing ease of use by the user, i.e., by reducing the number of pages that must be viewed, or the number of cursor manipulations required to be performed to complete the transaction. In such systems, each user is assigned a unique user ID. This user ID is sent to the server, e.g., manually entered or retrieved from a cookie placed on the client computer system, and can be used to access purchaser-specific information, e.g., in a database on the server. However, implementing a unique user ID in a corporate requisition environment can in some instances be burdensome for system administrator, particularly where there is a large number of employees, or where a high turn over rate of employees requires new accounts to be continually set up by an administrator.

An application architecture that is becoming widely used, particularly in the Internet environment, is the three-tier architecture. In this architecture, a client communicates requests to a server for data, software, and services, for example, and the server responds to the requests which may entail communication with a database management system for the storage and retrieval of persistent data. The three-tier architecture includes a database tier that includes a database server, an application or server tier that includes an application server and business logic (i.e., software application programs, functions, etc.), and a client tier. The application server responds to application requests (e.g., a request for a software applet, etc.) received from the client. The application server forwards data requests to the database server. An enterprise's application may involve all three tiers, as data that is used by the application may be stored in a database.

Conventionally, changes in an application, such as the addition of new forms of data or the revision of current forms of data, customization of the user interface, and so forth, often require that the client software and application software be rewritten to accommodate such changes. Usually, a software vendor will lack the additional time and resources to accommodate requests from its customers to create individual, customized versions of its application. However, a purchaser or user of a server application provided by the software vendor sometimes undertakes such changes to the application on its own. Since such changes to the application are not performed under the control of the software vendor, support and maintenance problem often arise for both the purchaser and the software vendor.

Accordingly, the present invention provides a server application having a standard application programming interface (API) which allows the purchaser of the server application to customize or create their own user interface which overcomes the above problems and others.

SUMMARY OF THE PRESENT INVENTION

A first aspect of the present invention is a system for generating a requisition for selectable items, including a client computer system and a server computer system interconnected via a network. The client computer system is configured to allow a plurality of users to access the server computer system. The system in accordance with the present invention further includes a server application comprising a user interface running on the server computer system. The server application has a multi-tier architecture including a first tier of client application code for initiating processing by the server application in response to input by a user of the client computer system, a middle tier of object-oriented server application code, and a third tier of shared access and data code. An application programming interface is further provided to allow customization of the user interface.

In a second aspect of the present invention, a client computer system and a server computer system interconnected via a network and the client system is configured to allow a plurality of users to access the server system, and the server computer system is configured to associate one of a plurality of work sites with each of the users. The server computer system is also configured to identify items which may be requisitioned by a user associated with the associated work site, and items which may not be requisitioned by a user associated with the associated work site, and to receive and process a request for one or more selected items. The server computer system further verifies that each requested item is an item that may be requisitioned by a user associated with the associated work site and generates a requisition for the verified items.

A third aspect of the present invention is a method for customizing a server application running on a server computer system, the server application of a type operated by a user of a client computer system. The server and client computer system are connected via a network and the server application comprises a user interface running on the server computer system. The server application has a multi-tier architecture comprising a first tier of client application code for initiating processing by the server application in response to input by a user of the client computer system, a middle tier of object-oriented server application code, and a third tier of shared access and data code. The method of the present invention comprises the steps of providing an application programming interface configured to access objects on the server directly and using said application programming interface to define a user interface of the server application.

A fourth aspect of the present invention is a method for generating a requisition over a network between a client computer system and a server computer system connected to the network, comprises assigning to the user one of a plurality of work sites and identifying items which may be requisitioned by a user associated with the associated work site, and items which may not be requisitioned by a user associated with the associated work site. The server computer system receives a request for the requisition of one or more items selected by a user and verifies that each requested item is an item that may be requisitioned by a user associated with the associated work site. A requisition for the verified items is then generated.

A fifth aspect of the present invention is a computer readable medium whose contents cause an information handling system to execute the method steps described above.

One advantage of the present invention is that it provides a user of the server application, such as a system administrator or the like, with a standard application programming interface (API) to create or customize a user interface to the server application.

Another advantage of the present invention is that it allows for qualified corporate users to be configured in advance, including their shipping information, corporate budgetary chargeback information, and so forth.

Another advantage of the present invention is that is readily adaptable to internal chargeback rather than payment.

Still further advantages and benefits of the present invention will become apparent to those of ordinary skill in the art upon reading and understanding the following detailed description of the preferred embodiments.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention and, together with the general description given above, and the description of the preferred embodiments given below, serve to explain the principles of the invention.

BRIEF DESCRIPTION OF THE DRAWINGS

The following is a brief description of each drawing used to describe the present invention, and thus, are being presented for illustration purposes only and should not be limitative of the scope of the present invention, wherein.

DETAILED DESCRIPTION OF THE PRESENT INVENTION

Figure 1:
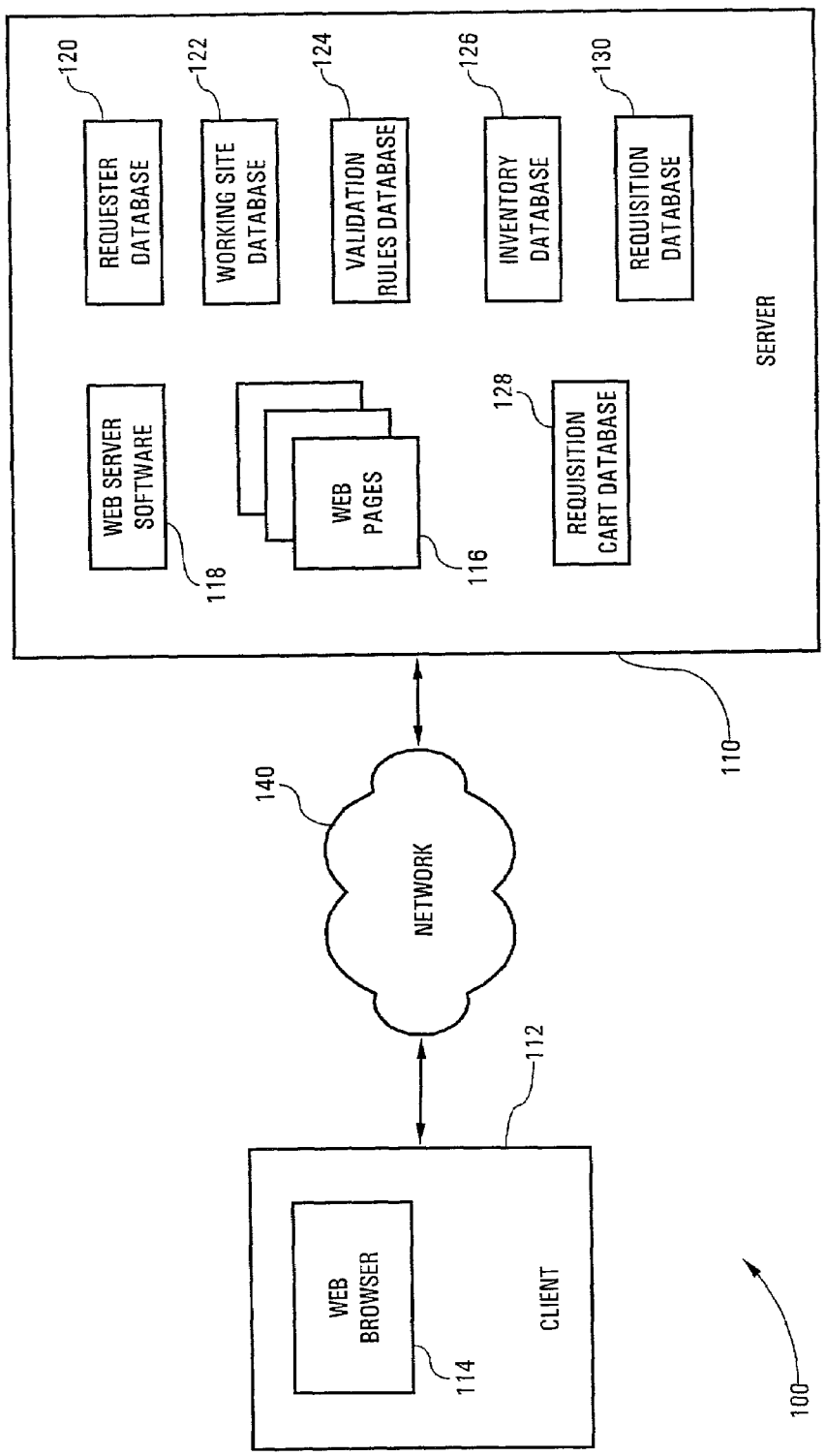
FIG. 1 is a block diagram illustrating an embodiment of the requisition according to the present invention.

Referring now to FIG. 1, a block diagram depicting an exemplary networked information handling system 100 in accordance with the present invention is shown. The information handling system 100 includes one or more network servers 110 interconnected with one or more remotely located client computer systems 112 configured to allow a user to use a browser over a network 140. The network 140 interconnecting server 110 and the remote client system 112 can include, for example, a local area network (LAN), metropolitan area network (MAN), wide area network (WAN), and the like, and interconnections thereof. Network connection 140 can be an Internet connection made using the World Wide Web, an intranet connection, or the like.

To requisition one or more items, or to inquire about an existing requisition, a user operates client computer system 112. The client computer system 112 operates web browser software 114 that allows the user to download and display web pages 116 contained on the server computer system 110.

To receive requisition information or inquiry information, the server system 110 operates web server software 118. The server computer system 110 further includes a requester database 120, a working site database 122, a validation rules database 124, an inventory database 126, a requisition cart database 128 and a requisition database 130. The databases 120, 122, 124, 126, 128, and 130 can be separate but linked or related databases, or alternately, can be database elements, such as tables, datastores, or repositories within a larger database.

The server computer system 110 and client computer system 112 interact by exchanging information via communications link 140, which may include transmission over the Internet. The server engine receives hypertext transfer protocol (HTTP) requests to access web pages identified by uniform resource locators (URLs) and provides the requested web pages to the client computer systems for display using browser 114, as is generally known in the art.

The requester database 120 contains information for individual users of the system and information for shared accounts, each of which is associated with a particular work site. The individual requester information is stored in a requester profile including, for example, one or more work sites to which the user belongs, information such as the name of the customer, default shipping information, default account information such as internal account chargeback information, state or location information, e-mail address, phone number, and so forth.

A working site database 122 contains information for each working site. Each user must be associated with at least one working site to place an order for a requisition. The working site database contains, for example, geographical information about the work place of all potential requesters. Since many fulfillment items, such as insurance forms, medical forms, and the like, vary in accordance with state or other jurisdictional requirements, a validation rule database 124 is used to associate each item in the inventory database 126 with respective valid working sites to prevent a requester from ordering or generating a requisition for items not appropriate for use at the requester's designated work site. The inventory database 126 also contains a description of the items, information as to the availability of the item, a linked image of the item, and so forth. The requisition cart database 128 contains a list of items that have been placed in each requester's shopping cart, and the requisition database 130 contains an entry for previously generated requisitions. The requisition database 130 preferably includes information about requisition that have not yet been fulfilled, as well as fulfilled requisitions, although fulfilled requisitions may be purged from the database after some predetermined period of time has elapsed or on a periodic basis.

Figure 2:
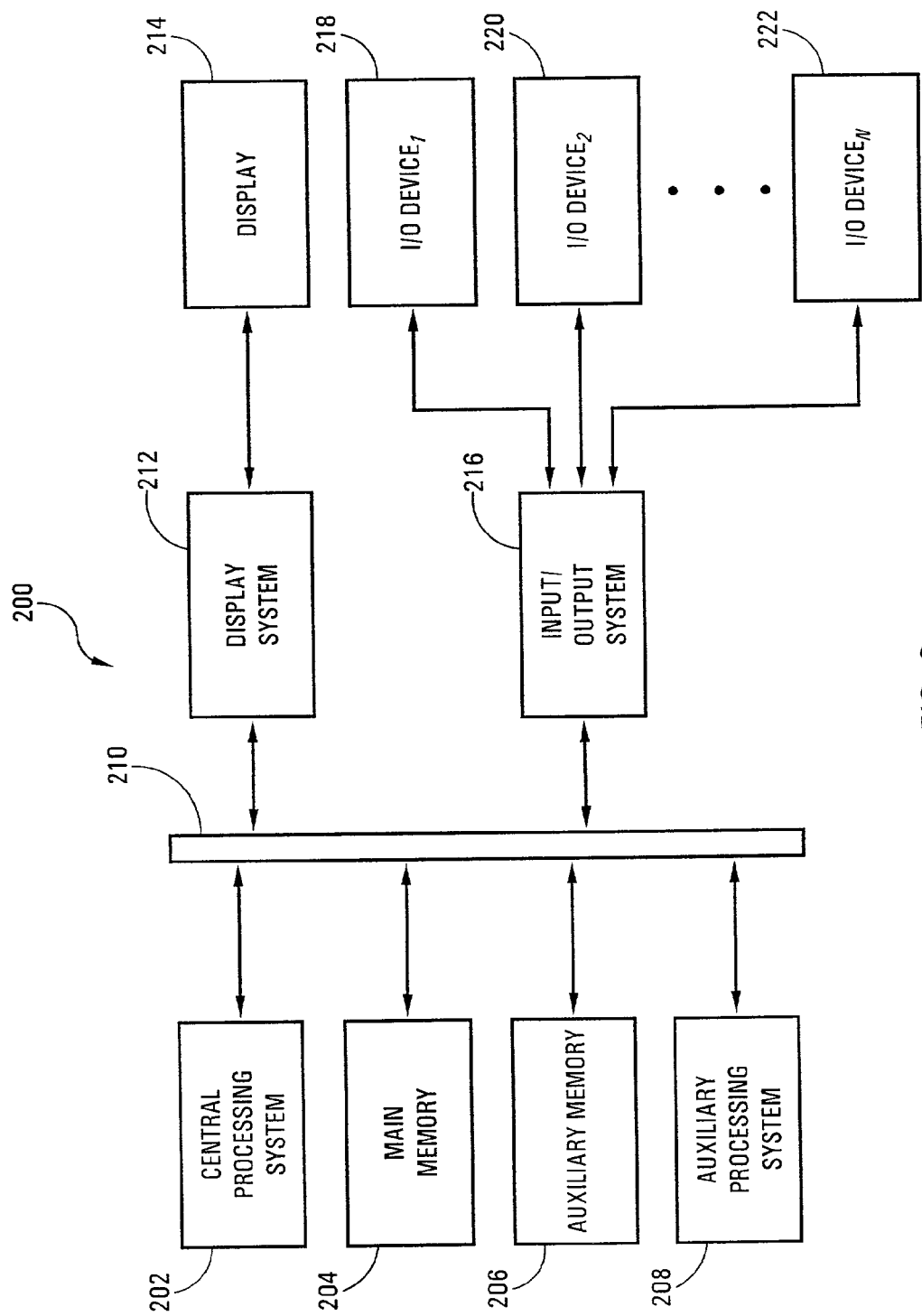
FIG. 2 is a block diagram of a hardware system generally representative of an exemplary server or client computer system shown in FIG. 1.

Referring now to FIG. 2, an information handling system operable to embody the present invention is shown. The hardware system 200 shown in FIG. 2 is generally representative of the hardware architecture of a computer-based information handling system of the present invention, such as the server computer system 110 or the client computer system 112 of the requisition system shown in FIG. 1. The hardware system 200 is controlled by a central processing system 202. The central processing system 202 includes a central processing unit such as a microprocessor or microcontroller for executing programs, performing data manipulations and controlling the tasks of the hardware system 200. Communication with the central processor 202 is implemented through a system bus 210 for transferring information among the components of the hardware system 200. The bus 210 may include a data channel for facilitating information transfer between storage and other peripheral components of the hardware system. The bus 210 further provides the set of signals required for communication with the central processing system 202 including a data bus, address bus, and control bus. The bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 200 include main memory 204, and auxiliary memory 206. The hardware system 200 may further include an auxiliary processing system 208 as required. The main memory 204 provides storage of instructions and data for programs executing on the central processing system 202. The main memory 204 is typically semiconductor-based memory such as dynamic random access memory (DRAM) and/or static random access memory (SRAM). Other semi-conductor-based memory types include, for example, synchronous dynamic random access memory (SDRAM), double data rate (DDR) SDRAM, Rambus dynamic random access memory (RDRAM), ferroelectric random access memory (FRAM), and so on. The auxiliary memory 206 provides storage of instructions and data that are loaded into the main memory 204 before execution. The auxiliary memory 206 may include semiconductor based memory such as read-only memory (ROM), programmable read-only memory (PROM), erasable programmable read-only memory (EPROM), electrically erasable programmable read-only memory (EEPROM), or flash memory (block oriented memory similar to EEPROM). The auxiliary memory 206 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 200 may optionally include an auxiliary processing system 208 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 200 further includes a display system 212 for connecting to a display device 214, and an input/output (I/O) system 216 for connecting to one or more I/O devices 218, 220, up to N number of I/O devices 222. The display system 212 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 214 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 216 may comprise one or more controllers or adapters for providing interface functions between the one or more I/O devices 218–222. For example, the input/output system 216 may comprise a serial port, parallel port, integrated device electronics (IDE) interfaces including AT attachment (ATA) IDE, enhanced IDE (EIDE), and the like, small computer system interface (SCSI) including SCSI-1, SCSI-2, SCSI-3, ultra SCSI, fiber channel SCSI, and the like, universal serial bus (JSB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 216 and I/O devices 218–222 may provide or receive analog or digital signals for communication between the hardware system 200 of the present invention and external devices, networks, or information sources. The input/output system 216 and I/O devices 218–222 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 200 of FIG. 2 by one having ordinary skill in the art would not depart from the scope or the spirit of the present invention.

Figure 3:
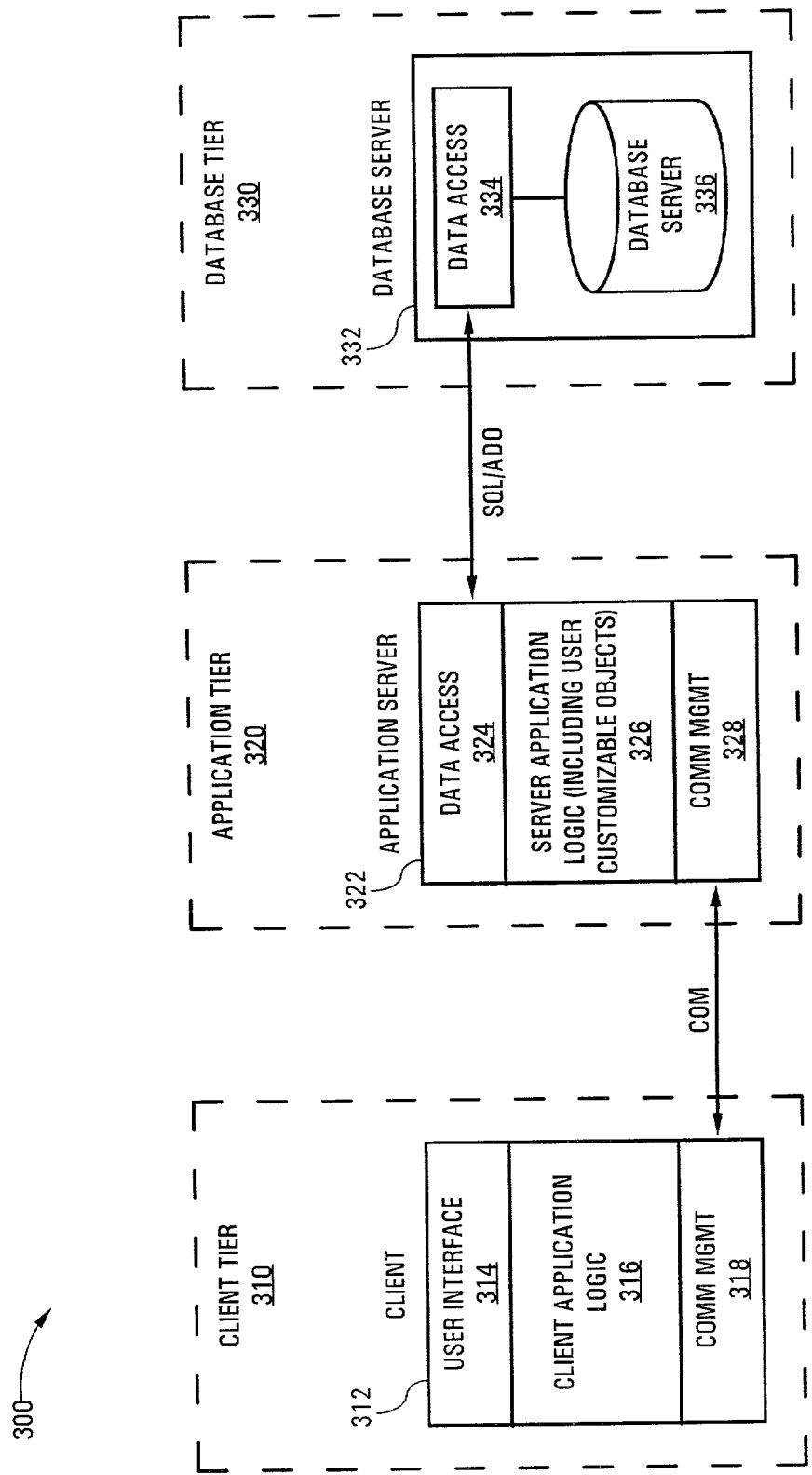
FIG. 3 is a block diagram of a multi-tier server application architecture having user-customizable code on a middle tier in accordance with the present invention.

With reference to FIG. 3, a multi-tier server application architecture 300 according to an illustrated embodiment of the invention segregates program code of the server application into three tiers, herein termed the client tier 310, the middle or server application tier 320, and the database tier 330. The client tier 310 consists of a computer system that provides a user interface 314 generated by a client 312. The client tier 310 comprises program code 316 that implements client application (the "client application logic"). Typically, the client application 316 runs on a user's workstation 112 (FIG. 1) that connects to the server computer 110 (FIG. 1) on the network 140 (FIG. 1). The client application 316 implements the user interface 314, such as a browser or other user interface application which responds to user inputs to initiate processing at the server computer 110. Client 312 generates a display from, for example, a specification of graphical user interface elements, such as a file containing input, form, and text elements defined using the Hypertext Markup Language (HTML) and/or from an applet which runs when it is loaded by the browser.

The server application tier 320 comprises program code 326 that implements the business logic of the server application (hereafter the "server application logic"). Typically, the server application runs on the server computer 110 (FIG. 1). The client application logic 316 communicates with the server application logic 326 using connectivity or communication management code 318–328 to initiate processing by the server application for the user. In one embodiment, the connectivity code 318–328 is the Component Object Model ("COM") protocol of Microsoft Corporation's OLE and ActiveX specifications. In alternative embodiments of the invention, the connectivity code 318–328 can be implemented using other protocols for remotely invoking processing functions of the server application, such as remote procedure calls, message passing, etc.

In accordance with the invention, the server application logic 326 on the server application tier comprises object-oriented code where access to individual object instances is customizable by the user. More particularly, the server application logic 326 is implemented as a set of server application components or COM objects which implement the server application logic 326, and an application programming interface (API) which allows the user of the server application, such as a system administrator or the like, to customize an existing user interface or create a new interface by allowing the user to access the object of server application logic 326 directly.

The database tier 330 comprises data that is accessed by the application logic in application tier 320. Database server 332 manages the data, its structure, and the operations that can be performed on the data and/or its structure. Typically, the data takes the form of a database 336, such as the Microsoft SQL Server relational database management system. Other database systems include Oracle and Sybase database systems. The server application components 326 use data access services 324–334 to access data from the database 336. In the illustrated embodiment, the data access services 324–334 take the form of SQL queries, or standardized database connections, e.g., conforming to the ActiveX Data Object (ADO) or Open Database Connectivity ("ODBC") call level interface. Database server 330 manages the database(s) 336 for the server applications and responds to requests to access user ID, worksite, inventory, validation, requisition, and requisition cart, for example.

Elements of the client tier 310, application tier 320, and database tier 330, such as the client 312, application server 322, and database server 332, may execute within a single computer or within multiple computers connected over a network such as a LAN, a WAN, or the internet, or combinations thereof.

Figure 4A:
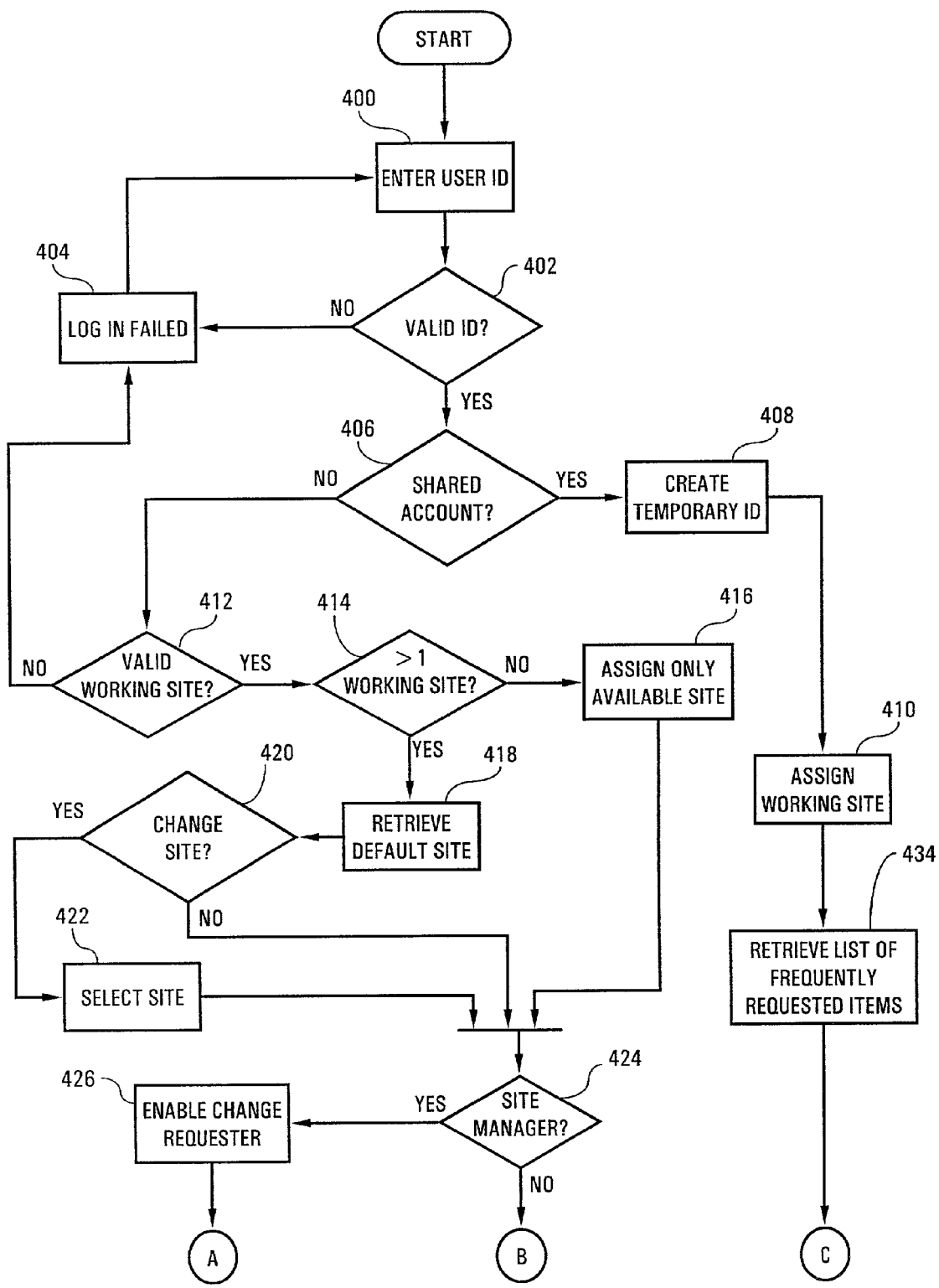
FIGS. 4A–4C are a flow diagram illustrating an exemplary method of generating an requisition.
Figure 4B:
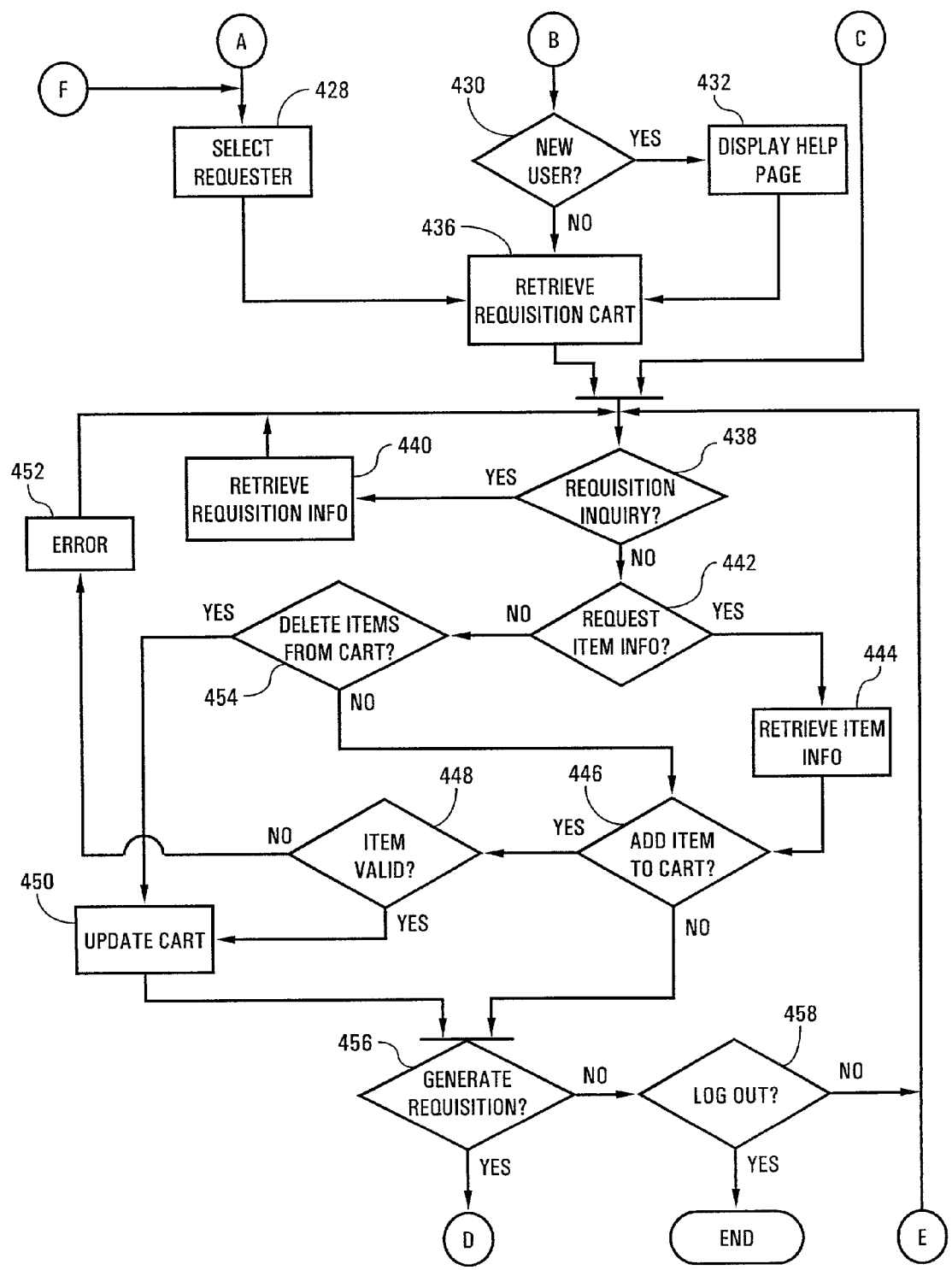
Figure 4C:
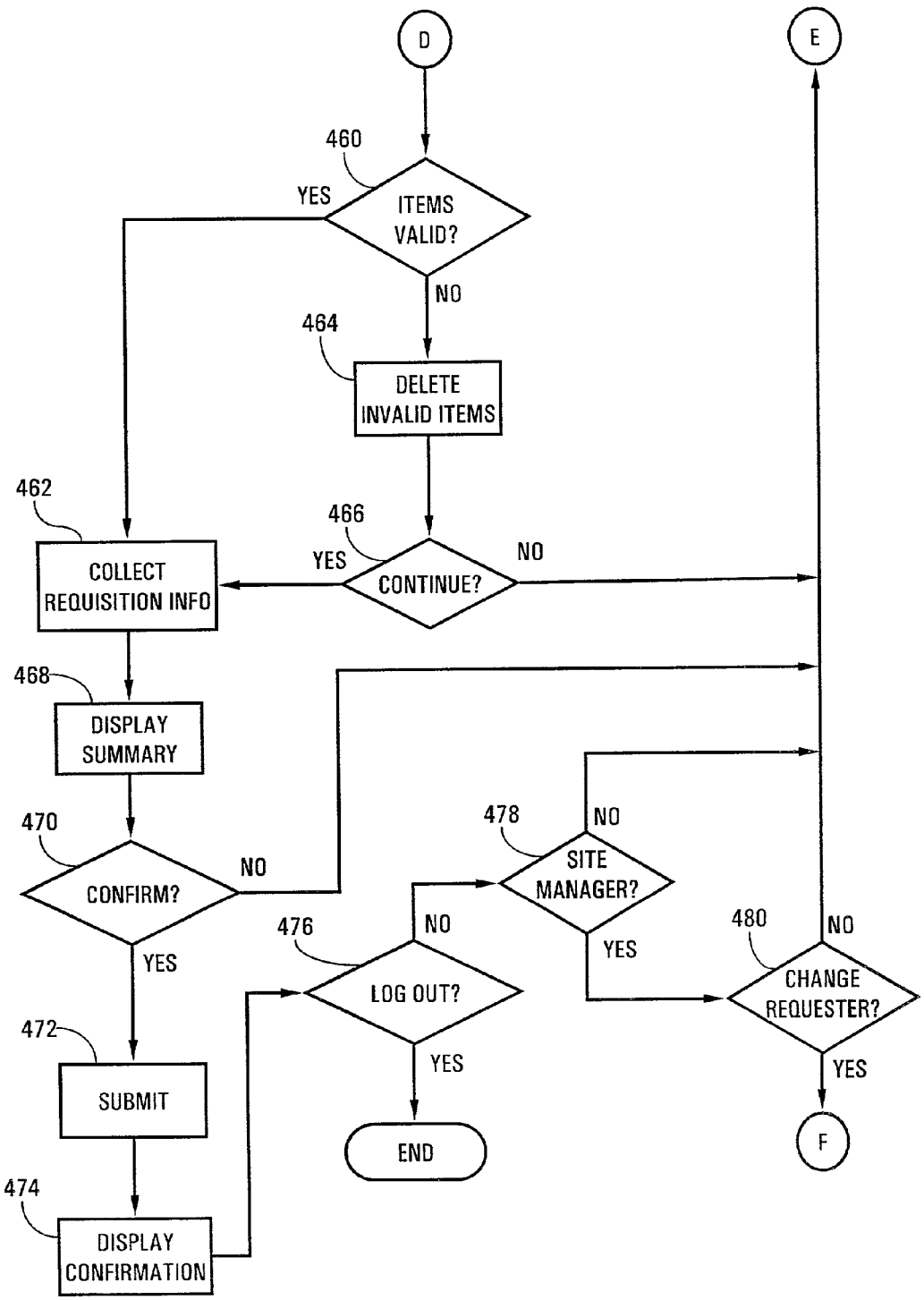

Referring now to FIGS. 4A, 4B, and 4C, there is shown an exemplary requisition method of the present invention. In the preferred embodiment, the requisition software is implemented as an Internet/intranet application running on a web server accessible using a web browser. A local user can access the application using an intranet connection and remote users can access the application via the Internet through a web site. In step 400, a user accesses the application using a web browser and is requested to provide a user ID, preferably by providing a log in web page displayed by the user's browser. Preferably the user ID is an ID/password combination. These IDs and passwords are preferably set up in advance to allow only qualified agents and employees of a company to request the company's consumables. If the user enters an invalid user ID at step 402, i.e., an ID or ID/password combination not found in the requester database 120, an error message is displayed at step 404 and the process returns to step 400. If the ID is valid at step 402 the user is logged into the system as a requester.

In the preferred embodiment, the system uses a user ID and password to find a valid entry in the requester database 120 to find a corresponding person ID, including a requester profile containing personal information for the user. This person ID will be used to validate sites from the working site database 122. A user must belong to at least one site. After successfully validating the user, person ID will be stored as the requester.

In step 406, it is determined whether the requester is using a shared account or an individual account. A shared account is a user ID which is assigned to more than one person who have the same work site. This shared user is associated with only one site, and cannot be a site manager, as described below. The requester database uses a default user profile including a dummy ship-to address setup so that it can be over-written by the requester. A default account code is also setup, for example, to be shared by all users using this shared account or to be over-written by the requester. There can be multiple shared accounts setup in the system for different purpose (e.g., assigned to different sites, etc.). If the account is a shared account, a new, unique, temporary ID is created in step 408 and the work site associated with the shared ID is assigned in step 410. Thus, when a user logs into the system using a shared account, the system automatically creates a new unique temporary requester, assigns this temporary requester to the shared account's predefined site, and copies default information, such as ship-to address and account codes, from the shared user account in the requester database. This new unique ID will then be used as the requester for this session. From this point on, this "one-time" requester will act as a regular requester throughout the whole time the user stays logged on or before the user session times out on the web server.

If it is determined that an individual (nonshared) ID has been entered (step 406), it is determined in step 412 whether the user belongs to at least one work site. If the requester does not belong to at least one site, the process proceeds to step 404 and an error message is displayed. If the user belongs to only one site (step 414), that site is assigned in step 416. If the user has multiple work sites, some default site is initially retrieved from the requester database at step 418. The initial site can be, for example, a default site selectable by the user and stored in requester database 120 or the first site of the multiple sites listed for that user. Other methods of selecting the initial site are also contemplated, such as defaulting to the site used for that user's most recent requisition, and so forth. The requester is given an option at step 420 to select a different site from that initially assigned (step 418). If the requester wishes to place a requisition for the default site, the process proceeds to step 424. If the user wishes to select a site other than that initially assigned, a new site is selected from the multiple valid sites for that user at step 422, e.g., using a pull down menu, radio buttons, or the like, before proceeding to step 424.

If the requester is a site manager (step 424), the ability to change requesters without the need to logout and re-login is enabled at step 426. In this manner, a site manager can generate requisitions or inquire into the status of outstanding or previously fulfilled requisitions for other users at the same working site in a single session. This is preferably performed by configuring the user interface displayed by the browser to include a menu command, tool bar entry, on-screen icon, or the like, to allow entry of other requester IDs. The site manager is preferably logged in initially as an individual user using his or her own personal profile, such as shipping address, account information, user selectable preferences, and so forth, allowing the site manager to enter requisitions or inquiries for himself/herself. The site manager is given an option to select another requester associated with the same site at step 428 before proceeding to step 436. In this manner, a site manager can enter or inquire about requisitions for other requesters who work at the same site. Once a new requester is selected, the requester ID will be changed from that of the site manager to that of the newly selected requester. All default information, such as shipping address, etc., also preferably changes based on this new selected requester. It will be recognized that the site manager can be given an option to return to step 428 at any time during the online session, e.g., by providing an on-screen icon, tool bar entry, menu entry, and the like.

If the requester is not a site manager (step 424), it is determined if the requester is a new user at step 430. This can be performed by incrementing a variable stored in the requester database 120 each time the user logs into the system, with the user being considered a new user if the number of times the user has logged in has not reached some selected threshold value. The threshold value may be some modest number, such as 1, 2, 3, 4, 5, etc. If the user is considered a new user (step 430), a help page or help menu is displayed to assist the requester at step 432 before proceeding to step 436. If the requester is not considered a new user at step 430, i.e., the user has previously logged in the preselected number of times, the process proceeds directly to step 436.

At step 436, the system retrieves the items in user's requisition cart from database 128 and displays the items contained requisition cart for the requester, e.g., in a requisition cart page. A requisition cart contains items preselected by the requester to be used at a later time to create a requisition. The preselection can be performed in the current session, or, in an earlier session in which the user logged in using the same site. For users associated with multiple work sites, a separate requisition cart is stored in database 128 for each requester/work site combination. The saved shopping cart is kept in the requisition database 128, identified by the requester and site. Since the requisition cart is kept in the database, the requester can log out or disconnect from the Internet without losing the selected items. When the requester logs back onto the system, the requisition cart will automatically be retrieved and displayed from the database. The requester can add items to or remove items from the requisition cart, or choose to empty the entire requisition cart. For example, an "Empty Cart" button can be provided on the requisition cart page to delete all items that are associated with the requester/site combination from the requisition cart database 128. A "Yes/No" warning message is optionally advantageously provided to confirm the deletion of the contents of the shopping cart. After the deletion, the requisition cart is preferably refreshed. Likewise, once a requisition is successfully created from the requisition cart, the requisition cart is also emptied by the system. However, for a user who uses a shared account to log in, the requisition cart will not be accessible by the requester after logging out of the system because the requester is assigned a new temporary requester ID each time the user logs into the system. Thus, if the user is using a shared user account to log in, the user is considered a new requester and thus the requisition cart is necessarily empty. Instead, a list of commonly requested items for that shared account or the assigned work site, can optionally be displayed at step 434.

The process proceeds from step 436 for an individual user or site manager, or step 434 for a shared account user, to step 438 in which the requester may inquire into the status of an existing requisition. The user may enter a requisition number or may select from a list of the user's previous requisitions. Such status information may include, for example, items and quantity ordered, the date ordered, the ship date or expected ship date, shipping charges, any back ordered items and their expected ship dates, method of delivery, a delivery service tracking number, a web link to a delivery service's web page for tracking a shipment, and the like. A requester who is also a site manager can inquire about all requisitions that have been entered from the same site. A requester who is not a site manager and is not a shared account user can only inquire about those requisitions that are entered using the same requester ID under which the user is currently logged in. If the requester is a shared user, the only search option available to the shared user is the requisition number. If, in step 438, the user has requested information about a prior requisition, the information is retrieved at step 440 from requisition database 130 for display by the browser and the process returns to step 438.

If, at step 438, the user has not requested information concerning a prior requisition, the process proceeds to step 442 and the user may request information about an item. Item information can be requested in a number of ways. Generally the requester searches for items to find them and verify information before adding them to the shopping cart, unless the user knows an item's ID number and does not need to verify the item information. Other methods of requesting item information at step 442 include, for example, retrieving a previously stored favorites list and selecting therefrom, retrieving a list of commonly requested items and selecting therefrom, or searching for an item, for example, by retrieving an item search page having text entry fields for one or more searchable parameters, such as item name, number, or other item ID, keywords, item description, coordinator ID, commodity, and the like, to generate a list of selectable items matching the entered search criteria. Other methods for searching for and retrieving items are also contemplated. If information about an item is requested at step 442, the information is retrieved at step 444 from the inventory database 126. Such information may include, for example, whether the item is in stock, the quantity in stock, expected receipt date for out of stock items, a description of the item, an image of the item, and so forth. The information may be distributed over multiple linked web pages, e.g., using separate pages for displaying stock information, general descriptions, detailed descriptions, images, and so forth. In a preferred embodiment, a search engine is provided to search the inventory database 126 in response to the entry of an item ID, key words, and so forth by the user. Preferably, the search engine only returns items which are valid for the assigned working site. For each item displayed, or about which information is displayed, the user is given the option of adding the item to the requisition cart. Alternately, items can be selected for display using a series of interactive prompts, an on-screen questionnaire, or a software wizard to guide the user through the process of finding and selecting items to be added to the shopping cart.

If, in step 446, the user indicates that an item is to be added to the cart, the item is validated at step 448 for the assigned work site using validation rules database 124. The item can be validated by matching items contained in validation rules database 124 with the assigned site. If the item is valid (step 448) for the assigned work site, the shopping cart stored in database 128 is updated accordingly at step 450, the cart page is preferably refreshed, and the process continues to step 456. If the item is not valid for the assigned working site (step 448), an error message is generated at step 452 informing the requester that the item can not be added to the shopping cart, and the process returns to step 438 and repeats. Preferably, items invalid for the assigned site are not be accessible to or viewable by the requester, or alternately, are displayed with a message that the item cannot be requested or without an option to add the item to the cart. For example, the item validation step can also be performed before returning the results of an item search to filter out items that can not be requisitioned by the requester. An item may be invalid for a number of reasons, such as because the item does not meet the state/code validation for the site the user is working in; because the item is not stocked in warehouses to which the user belongs or has access to; items are not requisitionable; items are restricted by other special validation rules; and so forth.

If the user does not request information about an item at step 442, the user may instead decide, at step 454, to delete items from the shopping cart. Preferably, an option is provided to delete items individually as well as to delete all items in the shopping cart. An item can be deleted when the cart page is displayed, for example, by clicking on a "Remove" button associated with the item. A "Yes/No" warning message is preferably provided to confirm deletion of the item. After the deletion, the requisition cart is updated at step 450 and the displayed cart page is preferably refreshed. The process continues on to step 456. If the user does not wish to delete any items from the shopping cart at step 454, the user may decide to add any items to the cart (step 446), e.g., without the need to search for the item or verify information about the item. Such items may be items for which the user knows the item or part number, is listed in a customized list, such as a "favorites," "most requested," or "recommendations" list, and so forth, e.g., displayed on-screen. The process then proceeds as described above.

If, at step 456, the user does not opt to generate a requisition for the items currently in the shopping cart, the process proceeds to step 458. If the user logs out at step 458, the process ends. If the user has not logged out at step 458, the process returns to step 438 and repeats to allow the user to continue adding items to or deleting items from the shopping cart, searching for items, and so forth. It will be recognized that the preferred embodiment has been described using an exemplary order of steps which illustrate a logical flow in requisition creation, the particular order of steps selected for ease of exposition. However, it will be recognized that many of the user options such as logging out of the system, selecting a new requester (site manager only), adding or deleting items from the cart, searching for information, creating the requisition, displaying the shopping cart, and so forth, may be simultaneously available for selection by the user at any time during the process, for example, in the form of on-screen icons, tool bars, menus, or hyper-linked entries, text entry fields (for entry of search terms or other information), and the like. Thus, a user who has retrieved a requisition cart at step 436 may decide to immediately log out by clicking on an on-screen "log out" item and proceed directly to step 458, e.g., with a "NO" implied at each of steps 438, 442, 454, 446, and 456. Similarly, a user who has retrieved a requisition cart at step 436 may decide to immediately generate a requisition using the current cart items and can proceed directly to step 456 by clicking an on-screen "submit requisition" object, e.g., wherein a "NO" implied at each of steps 438, 442, 454, and 446. Thus, it can be seen that the present system can provide a great deal of flexibility in allowing the user to select the manner of navigating through the system. The use of a wizard style interface comprising a series of interactive prompts following the illustrated order of steps or a different order of steps is also contemplated. Although the requester has the option of logging out at any time during the process, in which case the contents of the requisition cart are saved for a future session, the shopping cart contents are not saved for shared account users. Likewise, the system may be programmed to log a user out after a predefined period of inactivity.

When the user elects to generate a requisition (step 456) the items are preferably again verified at step 460 as being valid for the assigned site. Although in this preferred embodiment, invalid items cannot be added to the cart in a current session (see step 448), it is contemplated that items might be placed in the cart at a time when they are valid for the assigned work site, and then stored in the shopping cart for some period of time before creating a requisition during which time they become invalid or obsolete. For example, state law or other legal of jurisdictional requirements regulating the content of fulfillment pieces such as insurance or medical forms and the like may have changed since an item was added to a shopping cart. Likewise, items may be time sensitive or otherwise updated or replaced with new items. As one alternative to verifying the validity of the items in the shopping cart a second time at the time of checkout, the system can be programmed to purge all items that have been in the shopping cart for some preselected period of time. As another alternative, items in the shopping cart can be verified when the cart is initially retrieved (see step 436).

If each item in the cart is valid for the assigned site, the requisition generation proceeds to step 462. If one or more items in the cart are no longer valid for the assigned site, the items are deleted from the cart at step 464 and the requester is given the option to continue at step 466. If the requester decides not to continue at step 466, the process returns to step 438. At this point, the system may recommend alternative items. For example, if any item is obsolete but with replacement item, or is a regular item but with a substitute item, its replacement/substitute can be recommended. If the requester opts to continue at step 466 and nevertheless place a requisition without the invalid items, the process proceeds to step 462.

In step 462, requisition information, such as shipping address, delivery method, date needed, and the like, is collected, preferably through a series of interactive prompts, an on-screen questionnaire, or wizard style pages to guide the user through the process of creating a requisition. A summary of the requisition is displayed at step 468 and the user is given the option to confirm the details of the requisition before committing to the creation of the requisition at step 470. If the user does not, at step 470, confirm the requisition as displayed in step 468, a requisition is not created and the process returns to step 438 to allow the user to make any desired adjustments. If the user confirms the requisition at step 470, e.g., by clicking on a "Submit Requisition" button, the order is submitted (step 472), a requisition number is generated, and a confirmation of the requisition is displayed at step 474. The user may store the confirmation page as a file on client computer system 112, print out a hard copy, and so forth, to have a confirmation that the requisition was created.

The process proceeds to step 476 and if the user logs out at this point, the process ends. For example, when the requester clicks on an on-screen "Logout" option, the system ignores all current functions and brings the requester back to the log in page. If the requester is a temporary requester created from the shared account, all user variables are reset for the shared account and the temporary requester ID is deleted from the requester database. If the user has not logged out at step 476 and the user is not a site manager (step 478), the process returns to step 438 and repeats. If the user does not log out at step 476 and is a site manager (step 478), the user may change requester at step 480. If the site manager wishes to change requesters at step 480, the process returns to step 428 to select a new requester and the process repeats. Otherwise, the site manager continues the session using the same requester and the process returns to step 438 and repeats. Again, the user may also opt to log out at any time during the session in which case the contents of the requisition cart will be saved, except in the case of shared account users. Likewise, a site manager may change requester at any time during the session, with items currently in the original requester's cart stored in database 128 and items in the newly selected requester's cart retrieved from the database 128.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 204 of one or more computer systems configured generally as described in FIG. 2. Until required by the computer system, the set of instructions may be stored in another computer readable memory such as the auxiliary memory of FIG. 2, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, or optically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A customizable system for generating a requisition for user selectable print on demand items comprising:
   a client computer system connected to a network, the client computer configured to run web browser software;
   a server computer system connected to the network, the server computer configured to run web server software, the network interconnecting the client computer system and the server computer system, the client computer configured to allow a plurality of users to access the server computer system, and the server computer system comprising:
      a requestor database for associating individual users or shared account users with one or more work sites;
      a working site database for associating user attributes with one or more specific work sites;
      a validation rule database for associating items of inventory with one or more specific work sites;
      an inventory database for associating data describing print on demand items of inventory and the respective availability of the items of inventory;
      a requisition cart database for associating print on demand items a user has selected for potential requisitioning; and
      a requisition database for tracking previously generated requisitions;
   the server computer system configured to:
   associate one or more of a plurality of web page work sites with each of said users, each web page worksite accessible to a specific group of users having common attributes required for requisitioning user selectable print on demand items, the print on demand items tailored to the common attributes;
   associate the print on demand items with one or more of a plurality of work sites using client configurable validation rules associated with the items;
   identify associated Print on demand items which may be requisitioned by a user associated with the one or more associated work sites, and identify associated print on demand items which may not be requisitioned by a user associated with the one or more associated work sites;
   receive and process a request for one or more user selected print on demand items;
   verify that each user requested print on demand item is an item associated with the user's one or more associated work sites; and
   generate a requisition for the verified user requested print on demand items;
   a server application comprising a user interface running on the server computer system, the server application having a multi-tier architecture comprising a first tier of client application code for initiating processing by the server application in response to input by a user of the client computer system, a middle tier of object-oriented server application code, and a third tier of shared access and data code; and
   an application programming interface configured to allow customization of the user interface,
   wherein the customizable system is configured to allow a first user to access a first web work site including print on demand items tailored to the first user's attributes, and a second user to access a second web work site including print on demand items tailored to the second user's attributes.

2. The system of claim 1, wherein the user interface comprises one or more interface elements defined using HTML, the interface elements selected from one or more of input elements, form elements, and text elements.

3. The system of claim 1, wherein the requester database comprises data associating one or more of an user identifier, a password, and personal information for the plurality of users.

4. The system of claim 3, wherein the requester database contains at least one shared user entry, the shared user entry associated with a single work site.

5. The system of claim 1, wherein said inventory database comprises one or more of a item identifying indicia, an item description, and an image representation of each item.

6. The system of claim 1, further comprising a validation rules datastore associating each of said selectable items with one or more of a plurality of work sites with which a user must be associated to verify the item for a requisition.

7. The system of claim 6, wherein the validation rules are customizable via said application programming interface.

8. The system of claim 6, wherein the validation rules datastore is further configured to associate two or more of said selectable items with a single item identifier.

9. The system of claim 3, further comprising a database storing a list of items preselected by the user to be used at a later time to create a requisition.

10. The system of claim 3, further comprising a requisition database containing information about previously generated requisitions.

11. The system of claim 1, wherein the common attribute is the geographical location of the user.

12. A method for generating a requisition for user selectable print on demand items comprising:
   connecting a client computer system to a network, the client computer configured to run web browser software;
   connecting a server computer system to the network, the server computer configured to run web server software, the network interconnecting the client computer system and the server computer system, the client computer configured to allow a plurality of users to access the server computer system, and the server computer system comprising:
      a requestor database for associating individual users or shared account users with one or more work sites;
      a working site database for associating user attributes with one or more specific work sites;
      a validation rule database for associating items of inventory with one or more specific work sites;
      an inventory database for associating data describing print on demand items of inventory and the respective availability of the items of inventory;
      a requisition cart database for associating print on demand items a user has selected for potential requisitioning; and
      a requisition database for tracking previously generated requisitions;
   configuring the server computer system to perform the method comprising:
      associating one or more of a plurality of web page work sites with each of said users, each web page worksite accessible to a specific group of users having common attributes required for requisitioning user selectable print on demand items, the print on demand items tailored to the common attributes;
      associating the print on demand items with one or more of a plurality of work sites using client configurable validation rules associated with the items;
      identifying associated print on demand items which may be requisitioned by a user associated with the one or more associated work sites, and identify associated print on demand items which may not be requisitioned by a user associated with the one or more associated work sites;
      receiving and processing a request for one or more user selected print on demand items;
      verifying that each user requested print on demand item is an item associated with the user's one or more associated work sites; and
      generating a requisition for the verified user requested print on demand items;
   configuring a server application to run a user interface on the server computer system, the server application having a multi-tier architecture comprising a first tier of client application code for initiating processing by the server application in response to input by a user of the client computer system, a middle tier of object-oriented server application code, and a third tier of shared access and data code;
   configuring an application programming interface to allow customization of the user interface, and
   configuring the server computer system to allow a first user to access a first web work site including print on demand items tailored to the first user's attributes, and a second user to access a second web work site including print on demand items tailored to the second user's attributes.

13. The method of claim 12, wherein the user interface comprises one or more interface elements defined using HTML, the interface elements selected from one or more of input elements, form elements, and text elements.

14. The method of claim 12, wherein the client computer system and the server computer system communicate via the Internet.

15. The method of claim 12, further comprising identifying the user and retrieving information previously stored for the user.

16. The method of claim 12, further comprising providing at least one shared user account for use by multiple users, the shared user account associated with a single work site.

17. The method of claim 12, further comprising providing at least one managerial account associated with a single work site and allowing a user to generate a requisition for any other user associated with said single work site.

18. The method of claim 15, wherein the step of assigning a work site to a user is performed by retrieving previously stored information associating each user with at least one of a plurality of work sites.

19. The method of claim 18, further comprising displaying previously stored information about selectable items.

20. The method of claim 19, wherein the previously stored information comprises one or more of a item identifying indicia, an item description, and an image representation.

21. The method of claim 12, further comprising the step of displaying a previously stored a list of items preselected by the user to be used at a later time to generate a requisition.

22. The method of claim 12, further comprising the step of displaying previously stored information about previously generated requisitions.

* * * * *